(12) United States Patent
Vesala et al.

(10) Patent No.: US 8,734,291 B2
(45) Date of Patent: May 27, 2014

(54) HYDRAULIC FLUID SUPPLY SYSTEMS

(75) Inventors: Aleski Vesala, Jyvaskyla (FI); Erno Kilpelainen, Laukaa (FI)

(73) Assignee: Valtra Oy Ab, Soulahti (FI)

( * ) Notice: Subject to any disclaimer, the term of this patent is extended or adjusted under 35 U.S.C. 154(b) by 312 days.

(21) Appl. No.: 13/496,925

(22) PCT Filed: Sep. 13, 2010

(86) PCT No.: PCT/EP2010/063382
§ 371 (c)(1),
(2), (4) Date: Jul. 10, 2012

(87) PCT Pub. No.: WO2011/032911
PCT Pub. Date: Mar. 24, 2011

(65) Prior Publication Data
US 2012/0302398 A1    Nov. 29, 2012

(30) Foreign Application Priority Data

Sep. 18, 2009  (GB) .................................. 0916354.4

(51) Int. Cl.
*F16H 61/40*    (2010.01)
(52) U.S. Cl.
USPC .......................................................... 477/68
(58) Field of Classification Search
USPC ................... 477/68, 52, 34; 60/431
See application file for complete search history.

(56) References Cited

U.S. PATENT DOCUMENTS

| | | | |
|---|---|---|---|
| 7,206,689 B1 | 4/2007 | Johnson | |
| 7,686,737 B2 * | 3/2010 | Nishi et al. | 477/115 |
| 8,206,264 B2 * | 6/2012 | Nishi et al. | 477/115 |
| 2009/0101101 A1 * | 4/2009 | Iwamoto | 123/198 C |
| 2010/0009806 A1 * | 1/2010 | Shirao et al. | 477/52 |

FOREIGN PATENT DOCUMENTS

| | | |
|---|---|---|
| DE | 10307190 A1 | 9/2004 |
| DE | 102007062888 A1 | 7/2009 |
| EP | 1550803 A1 | 7/2005 |
| EP | 1595734 A1 | 11/2005 |
| GB | 1288260 A | 9/1972 |

OTHER PUBLICATIONS

International Search Report for International Application No. PCT/EP2010/063382 Dated Dec. 6, 2010.
Great Britian Search Report for Great Britian Application No. GB0916354.4 Dated Jan. 12, 2010.

* cited by examiner

*Primary Examiner* — David D Le
*Assistant Examiner* — David J Hlavka

(57) ABSTRACT

A tractor has an engine which drives the tractor via a transmission whose operative ratio is controlled electronically. The tractor also has an auxiliary hydraulic fluid supply system with an engine driven hydraulic pump which provides pressurized fluid to one or more auxiliary outlets on the tractor. A driver operated control means is provided for selecting the oil flow rate to be delivered to the outlets, and a control system adjusts the speed of the engine to the minimum required to provide the selected oil flow rate and changes the operative ratio of the tractor transmission so that the speed of the tractor remains substantially unchanged despite any change in engine speed required to deliver the selected oil flow rate. The transmission may be a CVT or powershift transmission.

12 Claims, 1 Drawing Sheet

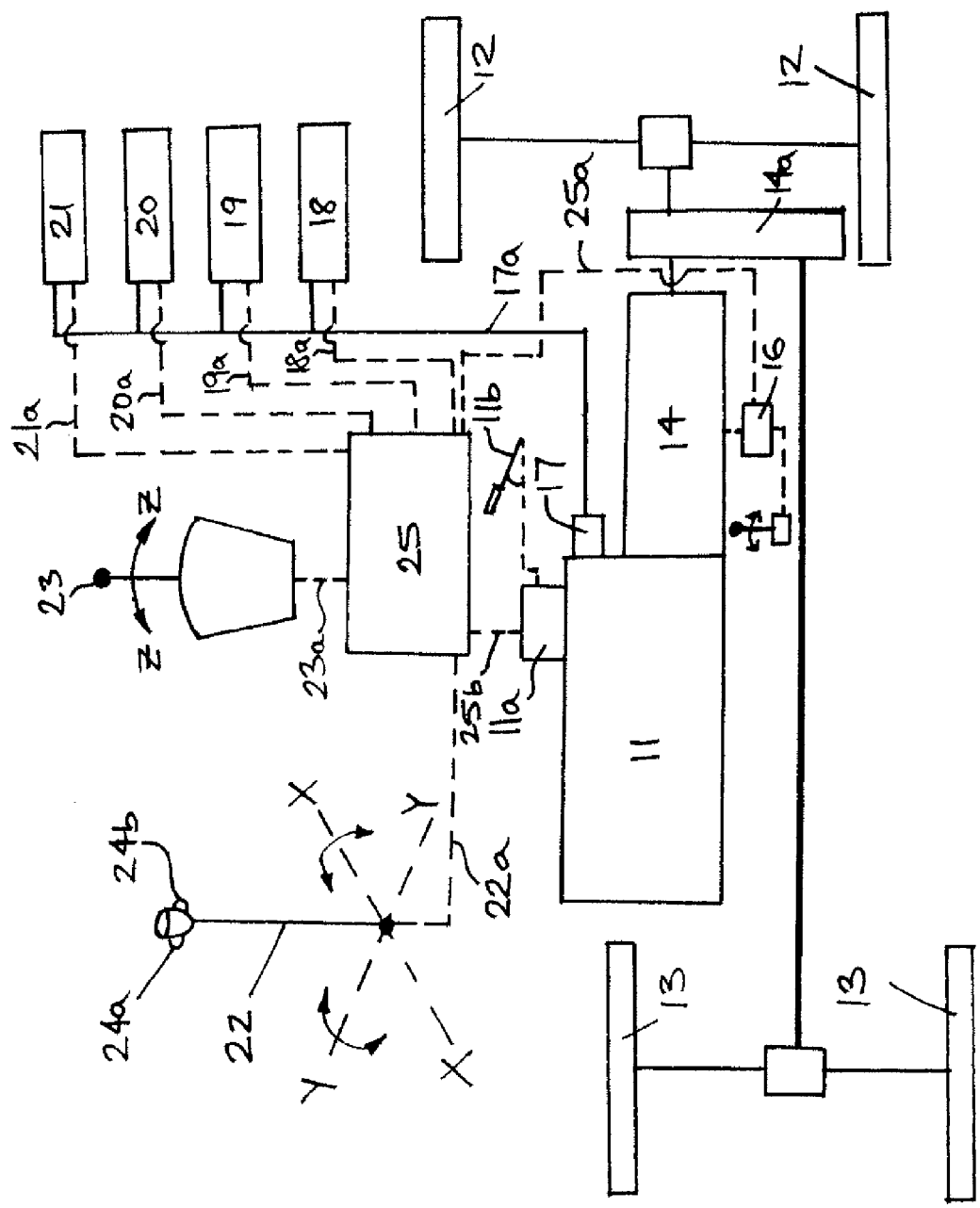

HYDRAULIC FLUID SUPPLY SYSTEMS

BACKGROUND OF THE INVENTION

1. Field of Invention

The invention relates to tractors and in particular to hydraulic fluid supply systems for tractors which supply pressurised fluid from an engine driven pump to auxiliary outlets such as spool valves used to control auxiliary equipment on the tractor such as a front loader.

2. Description of Related Art

Problems arise with such auxiliary equipment when high flow rates are demanded which the pump may not be able to deliver at the current engine speed.

BRIEF SUMMARY OF THE INVENTION

Thus according to the present invention there is provided a tractor having an engine which drives the tractor via a transmission whose operative ratio is controlled electronically, the tractor having an auxiliary hydraulic fluid supply system with an engine driven hydraulic pump which provides pressurised fluid to one or more auxiliary outlets on the tractor, a driver operated control means for selecting the oil flow rate to be delivered to the outlets, and a control system which adjusts the speed of the engine to the minimum required to provide the selected oil flow rate and changes the operative ratio of the tractor transmission so that the speed of the tractor remains substantially unchanged despite any change in engine speed required to deliver the selected oil flow rate.

Preferably the driver operated control means comprises one or more control levers or dials for selecting the flow rate to the or each auxiliary outlet.

The control system adds the flow rates selected for each outlet to give the total flow rate selected and adjusts the engine speed and transmission ratio accordingly.

When the transmission is a CVT, exactly the appropriate transmission can be selected.

If the transmission has a range of discrete ratios, the control system selects a transmission ratio which is closest to but above the ratio required to deliver the required oil flow rate and tractor speed

BRIEF DESCRIPTION OF THE DRAWINGS

The present invention will now de described with reference to the accompanying FIG. 1 which shows diagrammatically a tractor having a hydraulic fluid supply system embodying the present invention.

DETAILED DESCRIPTION OF THE INVENTION

Referring to the drawing, the tractor 10 has an engine 11 which drives the wheels 12 and 13 of the tractor via a transmission 14 and front wheel transfer drive 14a. The operative ratio of the transmission is controlled either manually by a driver operated control 15 or automatically in accordance with various operating parameters of the tractor by a transmission control unit 16.

Engine 11 is controlled by an electronic control unit 11a in response to movement of an accelerator pedal 11b and other well known tractor operating parameters. Engine 11 also drives an oil pump 17 (which may be either fixed volume per revolution or a variable displacement pump) via a fixed ratio drive. Pump 17 supplies pressurised fluid via line 17a to a number of auxiliary outlet valves 18 to 21 whose outlet flow rate is controlled by two levers, a first joystick lever 22 and a second simple pivoting control lever 23. In the arrangement shown valves 18 to 20 are controlled by joystick 22 and valve 21 is controlled by control lever 23.

Pivoting movement of the joystick about axis XX controls valve 18 and pivoting movement about axis YY at right angles to the axis XX controls valve 19. Joystick carries buttons 24a and 24b the depression of which operates the control valve 20. The pivoting of the control lever 23 in the direction ZZ controls the outlet of valve 21. These auxiliary outlet valves 18 to 21 are of the solenoid operated spool valve type and receive their solenoid commands from electronic valve control system 25 via lines 18a to 21a. System 25 in turn receives the tractor operator's commands from joystick 22 via line 22a and from control lever 23 via line 23a.

Additionally, in accordance with the present invention, the valve control system 25 is connected with the transmission 14 (in this case via the control unit 16) via line 25a to effect changes in the operative ratio of the transmission as will be described below.

If, for example, the tractor is being used to operate a front loader, valve 18 can be used to operate the loader arm raise and lower cylinders, valve 19 to operate the bucket angle control cylinder and the push buttons 24a and 24b can be used to open and close a clam shell fitted to the bucket. Thus the arms of the loader can be raised and lowered by pivoting of the joystick 22 about axis XX, the bucket angle can be adjusted by moving the joystick sideways about axis YY. Any clam shell fitted to the bucket can be open and closed by operating buttons 24a and 24b.

In accordance with the present invention, valve control system 25 calculates or estimates the total oil flow rate requested at any moment by operation of the joystick 22 (and the control lever 23 of this also is being used to operate valve 21). The control system then calculates the engine speed required to deliver this oil flow rate knowing the fixed gear ratio which connects the pump 17 to the engine 11 and the pump volume per revolution. This engine speed is then selected by engine controller 11a as instructed via line 25b and the transmission ratio provided by transmission 14 is adjusted to ensure that the forward speed of the tractor remains substantially that previously requested by the tractor driver or control unit 16.

Since there are a number of ways in which the output of auxiliary valves 18 to 21 can be controlled there are corresponding number of ways in which the oil flow rate selected by the operator can be calculated or estimated.

For example, if the valves are operated on a flow volume principle and only valves 18 to 20 are being operated by joystick 22 and the selected volumes for valves 18 to 20 are 40, 50 and 60 liters/min respectively, the total volume required will be:

$$V_{TOTAL} = 40 + 50 + 60 \text{ litres min}$$

$$= 150 \text{ litres/min}$$

On the other hand, for example, if a percentage command principle is being used with valves having a flow scaling factor (fs) which is set for each valve so that each valve can only deliver up to a preselected percentage (fs) of its maximum flow then, for example, the require volume for valve 18 would be $$V18\text{FLOW} = Fs \cdot V18 \cdot \text{Commanded \%} \cdot \text{Maximum flow rate of valve 18.}$$

If the flow scaling factors of valves V18 to V20 are 100, 50 and 55% respectively and their commanded % flows are 50%, 100% and 100% respectively with respective maximum flow rates of 100 L/min, 50 L/min and 100 L/min then the total flow rate requested will be:

$$\text{Total flow} = 100\% \cdot 50\% \cdot 100 \text{ L/min} + 50\% \cdot 100\% \cdot 50 \text{ L/min} + 55\% \cdot 100\% \cdot 100 \text{ L/min}$$

$$\text{Total flow} = 50 \text{ L/min} + 25 \text{ L/min} + 55 \text{ L/min}$$

$$= 130 \text{ L/min}$$

As will be appreciate, whatever method is used to calculate or estimate the requested flow rate through the auxiliary valves 18 to 21 the control unit 25 calculates the required engine speed and also the new operative gear ratio required from transmission 14 in order to maintain the tractor forward speed substantially constant.

If transmission is a CVT then the exact ratio required can be selected. For example, if the tractor has an engine speed of 1000 rpm and the currently operative gear ratio of 0.5 and the control system 25 determines that in order to provide the selected flow rate from the valves 18 to 21 an engine speed of 2000 rpm is now required this will require the transmission gear ratio to be changed to 1.0 in order to provide the same output wheel speed.

If, for example, the transmission was a powershift transmission and the gear ratios available are 0.9 and 1.10 respectively, the control system will select the ratio 1.10 (i.e. the closest ratio above the required ratio) so that the new output speed will be 2200 rpm and this will maintain substantially the same vehicle speed and ensure sufficient engine speed to deliver the require volume flow rate to the hydraulic valves.

The invention claimed is:

1. A tractor having an engine which drives the tractor via a transmission whose operative ratio is controlled electronically, the tractor having an auxiliary hydraulic fluid supply system with an engine driven hydraulic pump which provides pressurised fluid to one or more auxiliary outlets on the tractor, a driver operated control means for selecting the oil flow rate to be delivered to the outlets, and a control system which adjusts the speed of the engine to the minimum required to provide the selected oil flow rate and changes the operative ratio of the tractor transmission so that the speed of the tractor remains unchanged despite any change in engine speed required to deliver the selected oil flow rate.

2. A tractor according to claim 1 in which the driver operated control means comprises one or more control levers or dials for selecting the flow rate to the or each auxiliary outlet.

3. A tractor according to claim 1 in which the control system adds the flow rates selected for each outlet to give the total flow rate selected and adjusts the engine speed and transmission ratio accordingly.

4. A tractor according to claim 1 in which the driver operated control means comprises one or more control levers or dials for selecting the flow rate to the or each auxiliary outlet and wherein the control system adds the flow rates selected for each outlet to give the total flow rate selected and adjusts the engine speed and transmission ratio accordingly.

5. A tractor having an engine which drives the tractor via a transmission whose operative ratio is controlled electronically, the tractor having an auxiliary hydraulic fluid supply system with an engine driven hydraulic pump which provides pressurised fluid to one or more auxiliary outlets on the tractor, a driver operated control means for selecting the oil flow rate to be delivered to the outlets, and a control system which adjusts the speed of the engine to the minimum required to provide the selected oil flow rate and changes the operative ratio of the tractor transmission so that the speed of the tractor remains unchanged despite any change in engine speed required to deliver the selected oil flow rate, wherein the transmission is a CVT.

6. A tractor according to claim 5 in which the driver operated control means comprises one or more control levers or dials for selecting the flow rate to the or each auxiliary outlet.

7. A tractor according to claim 5 in which the control system adds the flow rates selected for each outlet to give the total flow rate selected and adjusts the engine speed and transmission ratio accordingly.

8. A tractor according to claim 5 in which the driver operated control means comprises one or more control levers or dials for selecting the flow rate to the or each auxiliary outlet and the control system adds the flow rates selected for each outlet to give the total flow rate selected and adjusts the engine speed and transmission ratio accordingly.

9. A tractor having an engine which drives the tractor via a transmission whose operative ratio is controlled electronically, the tractor having an auxiliary hydraulic fluid supply system with an engine driven hydraulic pump which provides pressurised fluid to one or more auxiliary outlets on the tractor, a driver operated control means for selecting the oil flow rate to be delivered to the outlets, and a control system which adjusts the speed of the engine to the minimum required to provide the selected oil flow rate and changes the operative ratio of the tractor transmission so that the speed of the tractor remains unchanged despite any change in engine speed required to deliver the selected oil flow rate, wherein the transmission is a powershift with a range of discrete ratios, and the control system selects a transmission ratio which is closest to but above the ratio required to deliver the required oil flow rate and tractor speed.

10. A tractor according to claim 9 in which the driver operated control means comprises one or more control levers or dials for selecting the flow rate to the or each auxiliary outlet.

11. A tractor according to claim 9 in which the control system adds the flow rates selected for each outlet to give the total flow rate selected and adjusts the engine speed and transmission ratio accordingly.

12. A tractor according to claim 9 in which the driver operated control means comprises one or more control levers or dials for selecting the flow rate to the or each auxiliary outlet and wherein the control system adds the flow rates selected for each outlet to give the total flow rate selected and adjusts the engine speed and transmission ratio accordingly.

* * * * *